US008849835B1

(12) United States Patent
Carmi et al.

(10) Patent No.: US 8,849,835 B1
(45) Date of Patent: Sep. 30, 2014

(54) RECONCILING DATA

(75) Inventors: Eyal Carmi, Jersey City, NJ (US);
Daniel H Harrison, Petersburg, MI (US); Andrew Hogue, Ho-Ho-Kus, NJ (US); Gregory A Morris, New York, NY (US)

(73) Assignee: Google Inc., Mountain View, CA (US)

( * ) Notice: Subject to any disclaimer, the term of this patent is extended or adjusted under 35 U.S.C. 154(b) by 75 days.

(21) Appl. No.: 13/287,641

(22) Filed: Nov. 2, 2011

Related U.S. Application Data

(60) Provisional application No. 61/484,643, filed on May 10, 2011.

(51) Int. Cl.
*G06F 17/30* (2006.01)
*G06F 7/00* (2006.01)

(52) U.S. Cl.
USPC ............ 707/748; 707/730; 707/749; 707/750

(58) Field of Classification Search
None
See application file for complete search history.

(56) References Cited

U.S. PATENT DOCUMENTS

| 6,154,737 | A  | * | 11/2000 | Inaba et al. ................. 707/696 |
| 7,580,921 | B2 | * | 8/2009  | Patterson ............................ 1/1 |
| 7,949,654 | B2 | * | 5/2011  | Das et al. ..................... 707/718 |
| 8,468,160 | B2 | * | 6/2013  | Hassanzadeh et al. ....... 707/748 |
| 2009/0198677 | A1 | * | 8/2009 | Sheehy et al. .................. 707/5 |

* cited by examiner

*Primary Examiner* — Sangwoo Ahn
(74) *Attorney, Agent, or Firm* — Harrity & Harrity, LLP

(57) ABSTRACT

Methods, systems, and apparatus, including computer program products, are described for reconciling data. In one implementation, a method includes generating co-occurrence scores indicating whether data in entries in a first source of data co-occur within documents in a plurality of documents with data in entries in a second source of data. The co-occurrence scores for a given entry in the first source of data are used to identify a plurality of candidate matching entries in the second source of data for the given entry. Data in fields in the given entry are compared to that of one or more of the candidate matching entries to produce field similarity scores. The field similarity scores and the co-occurrence scores are used to determine a match for the given entry among the plurality of candidate matching entries.

24 Claims, 10 Drawing Sheets

Example First Annotation Vector for a Particular Document

500

| Entry ID | [Byte Span] | [Byte Span] | ... |
|---|---|---|---|
| A1 → | $[D_a, P_a]$ | $[D_b, P_b]$ | ... |
| A2 → | $[D_c, P_c]$ | $[D_d, P_d]$ | ... |
| A3 → | $[D_e, P_e]$ | $[D_f, P_f]$ | ... |
| A4 → | $[D_g, P_g]$ | $[D_f, P_f]$ | ... |
| A5 → | $[D_g, P_g]$ | $[D_h, P_h]$ | ... |
| ... → | ... | ... | ... |

Fig. 5A

Example Second Annotation Vector for a Particular Document

550

| Entry ID | [Byte Span] | [Byte Span] | ... |
|---|---|---|---|
| B1 → | $[D_a, P_a]$ | $[D_b, P_b]$ | ... |
| B2 → | $[D_c, P_c]$ | $[D_d, P_d]$ | ... |
| B3 → | $[D_e, P_e]$ | $[D_f, P_f]$ | ... |
| B4 → | $[D_g, P_g]$ | $[D_f, P_f]$ | ... |
| B5 → | $[D_g, P_g]$ | $[D_h, P_h]$ | ... |
| ... → | ... | ... | ... |

Fig. 5B

Co-Occurrence Similarity Matrix

| C = Co-Occurrence | | | | | | |
|---|---|---|---|---|---|---|
| Entry ID | B1 | B2 | B3 | B4 | B5 | ... |
| A1 | C(A1,B1) | C(A1,B2) | C(A1,B3) | C(A1,B4) | C(A1,B5) | ... |
| A2 | C(A2,B1) | C(A2,B2) | C(A2,B3) | C(A2,B4) | C(A2,B5) | ... |
| A3 | C(A3,B1) | C(A3,B2) | C(A3,B3) | C(A3,B4) | C(A3,B5) | ... |
| A4 | C(A4,B1) | C(A4,B2) | C(A4,B3) | C(A4,B4) | C(A4,B5) | ... |
| A5 | C(A5,B1) | C(A5,B2) | C(A5,B3) | C(A5,B4) | C(A5,B5) | ... |
| ... | ... | ... | ... | ... | ... | ... |

Fig. 6A

Jaccard Similarity Matrix

| J = Jaccard | | | | | | |
|---|---|---|---|---|---|---|
| Entry ID | B1 | B2 | B3 | B4 | B5 | ... |
| A1 | J(A1,B1) | J(A1,B2) | J(A1,B3) | J(A1,B4) | J(A1,B5) | ... |
| A2 | J(A2,B1) | J(A2,B2) | J(A2,B3) | J(A2,B4) | J(A2,B5) | ... |
| A3 | J(A3,B1) | J(A3,B2) | J(A3,B3) | J(A3,B4) | J(A3,B5) | ... |
| A4 | J(A4,B1) | J(A4,B2) | J(A4,B3) | J(A4,B4) | J(A4,B5) | ... |
| A5 | J(A5,B1) | J(A5,B2) | J(A5,B3) | J(A5,B4) | J(A5,B5) | ... |
| ... | ... | ... | ... | ... | ... | ... |

Fig. 6B

Occurrence & Mentions Count

| Entry ID | Occurrence | Mentions |
|---|---|---|
| A1 | O(A1) | M(A1) |
| A2 | O(A2) | M(A2) |
| A3 | O(A3) | M(A3) |
| A4 | O(A4) | M(A4) |
| A5 | O(A5) | M(A5) |
| ... | ... | ... |
| B1 | O(B1) | M(B1) |
| B2 | O(B2) | M(B2) |
| B3 | O(B3) | M(B3) |
| B4 | O(B4) | M(B4) |
| B5 | O(B5) | M(B5) |
| ... | ... | ... |

Fig. 6C

RECONCILING DATA

CROSS-REFERENCE TO RELATED APPLICATIONS

This application claims the benefit of U.S. Provisional Application No. 61/484,643, entitled "Reconciling Data" filed 10 May 2011, which is incorporated by reference herein.

BACKGROUND

The present specification relates to data management. In particular, it relates to identifying entries in different sources of data, e.g., databases, that correspond to the same object, such as the same book, the same restaurant or the same phone number.

Many organizations maintain databases of entries or records containing data about relevant objects. Each entry may be divided into fields, where each field includes data about a particular attribute of the object which is represented by the entry. For example, a book database maintained by an online bookseller may include an entry for each book it sells, where the entry for a particular book may include information such as the book title, author, etc. As another example, an entry in a database of businesses may include information such as business name, address, phone number, etc.

Generally, the structure and semantics of the entries will vary among independently managed databases. For example, in one database, the business address may be stored in a single field, whereas, in another database, the same information might be stored across multiple fields. In addition, abbreviations, synonyms, and other differences in data recording conventions between the databases, will result in different data representations of the same information. Furthermore, the data quality may differ between the databases due to a variety of factors, including data entry errors and missing data. As a result of the various possible differences between the databases, it may be difficult to determine whether two entries refer to the same object by directly comparing data in the entries.

It is therefore useful to provide techniques for determining whether entries in different databases refer to the same object.

SUMMARY

In one implementation, a method is described comprising generating co-occurrence scores indicating whether data in entries in a first database co-occur within documents in a plurality of documents with data in entries in a second database. The method includes using the co-occurrence scores for a given entry in the first database to identify a plurality of candidate matching entries in the second database for the given entry. The method further includes comparing data in fields in the given entry to that of one or more of the candidate matching entries to produce field similarity scores. The method further includes using the field similarity scores and the co-occurrence scores to determine a best match for the given entry among the plurality of candidate matching entries. Other implementations include corresponding systems, apparatus, and computer program products.

In one implementation, a method includes generating co-occurrence scores indicating whether data in entries in a first source of data co-occur within documents in a plurality of documents with data in entries in a second source of data. The co-occurrence scores for a given entry in the first source of data are used to identify a plurality of candidate matching entries in the second source of data for the given entry. Data in fields in the given entry are compared to that of one or more of the candidate matching entries to produce field similarity scores. The field similarity scores and the co-occurrence scores are used to determine a match for the given entry among the plurality of candidate matching entries. Other implementations include corresponding systems, apparatus, and computer program products.

Particular embodiments of the subject matter described in this specification can be implemented for reconciling data in a manner which is robust against differences in the structures and semantics of entries in different sources of data, such as different databases.

These and other embodiments can optionally include one or more of the following features.

The co-occurrence scores can further indicate whether data in entries in the first database co-occur in overlapping locations in documents in the plurality of documents with data in entries in the second database.

The method can further include, for a particular document in the plurality of documents, further generating a first annotation table describing entries in the first database having data that occurs in the particular document. The method can further include generating a second annotation table describing entries in the second database having data that occurs in the particular document. The method can further include comparing the first and second annotation tables to generate co-occurrence scores for the particular document.

The method can further include aggregating the co-occurrence scores over the plurality of documents to produce a co-occurrence matrix, and using the co-occurrence matrix to identify the plurality of candidate matching entries.

The method can further include, for a particular pair of entries between the first database and the second database, further generating a first annotation table describing documents in the plurality of documents in which data in a first entry in the particular pair occurs. The method can further includes generating a second annotation table describing documents in the plurality of documents in which data in a second entry in the particular pair occurs. The method can further includes comparing the first and second annotation tables to produce a co-occurrence matrix, and using the co-occurrence matrix to identify the plurality of candidate matching entries.

The method can further include generating an occurrence count for a particular entry in the first and second databases. The occurrence count indicates a number of documents in the plurality of documents in which data in the particular entry occur. The method can further include generating a mentions count for the particular entry in the first and second databases. The mentions count indicates a number of locations in documents in the plurality of documents in which data in the particular entry occur. The method can further include using the occurrence count and the mentions count for the particular entry to generate the co-occurrence scores.

The method can further include generating an occurrence count for a particular entry in the first and second databases. The occurrence count indicates a number of documents among the plurality of documents in which data in the particular entry occur. The method can further include selecting the given entry as an entry in the first database having the largest occurrence count among the entries in the first database.

The method can further include, after determining the best match for the given entry, selecting another entry in the first database having a next largest occurrence count among the entries in the first database. The method can further include using the co-occurrence scores for the another entry to identify a second plurality of candidate matching entries to produce field similarity scores for the another entry. The method can further include using the field similarity scores and the co-occurrence scores for the another entry to determine a best match among the second plurality of candidate matching entries.

Particular aspects of one or more embodiments of the subject matter described in this specification are set forth in the drawings and the description below. Other features, aspects, and advantages of the subject matter will become apparent from the description, the drawings, and the claims.

BRIEF DESCRIPTION OF THE DRAWINGS

FIG. 5A illustrates an example first annotation table generated by the co-occurrence module for a particular document.

FIG. 5B illustrates an example second annotation table generated by the co-occurrence module for a particular document.

FIG. 6A illustrates an example co-occurrence similarity matrix maintained by the co-occurrence module.

FIG. 6B illustrates an example Jaccard similarity matrix maintained by the co-occurrence module.

FIG. 6C illustrates an example occurrence and mentions table maintained by the co-occurrence module.

DETAILED DESCRIPTION

Matching can be the process of identifying an entry in one source of data, e.g., a database, which represents the same object, such as a book or a restaurant or a phone number, as that of an entry in another source of data, e.g., another database.

An implementation is described herein for identifying matching entries between a first database and a second database. The first database and the second database may be different databases or different portions of the same database, for example. The implementation includes generating co-occurrence scores indicating whether data in entries in the first database co-occur within documents in a collection of documents with data in entries in the second database. In a database of restaurants, for example, an entry for a particular restaurant may for example include data such as the restaurant name, address, location (e.g. latitude/longitude and/or physical address), phone number and web address of the particular restaurant. A document in the collection of documents may for example be a web page, or any other type of electronic document containing text represented in a computer readable format.

The co-occurrence scores may for example include a co-occurrence count between each entry in the first database and each entry in the second database. The co-occurrence count between an entry $A_i$ in the first database and an entry $B_j$ in the second database is a measure of the number of documents in which data in the entry $A_i$ and data in the entry $B_j$ both occur.

The co-occurrence scores for a given entry in the first database are used to identify a plurality of candidate matching entries in the second database for the given entry. The number of entries included in the plurality of candidate matching entries can vary from embodiment to embodiment. In one embodiment, the five highest ranking entries in the second database are selected as the candidate matching entries. Alternatively, the number of entries may be different than five.

In some implementations, an entry includes one or more fields. Data in fields in the given entry in the first database are compared to that of each of the candidate matching entries to produce field similarity scores. The field similarity scores are a measure of the similarity of data in the given entry to that of each of the candidate matching entries. The field similarity scores and the co-occurrence scores are used to determine a best match for the given entry among the plurality of candidate matching entries. The criteria for determining the 'best' match can vary from embodiment to embodiment. In one embodiment, the best match is the candidate matching entry having the highest classifier confidence signal as output by a statistical classifier. The classifier confidence signal for each candidate matching entry is a measure of the likelihood that the candidate matching entry is a match for the given entry. Alternatively, other criteria may be used.

Figure 1:
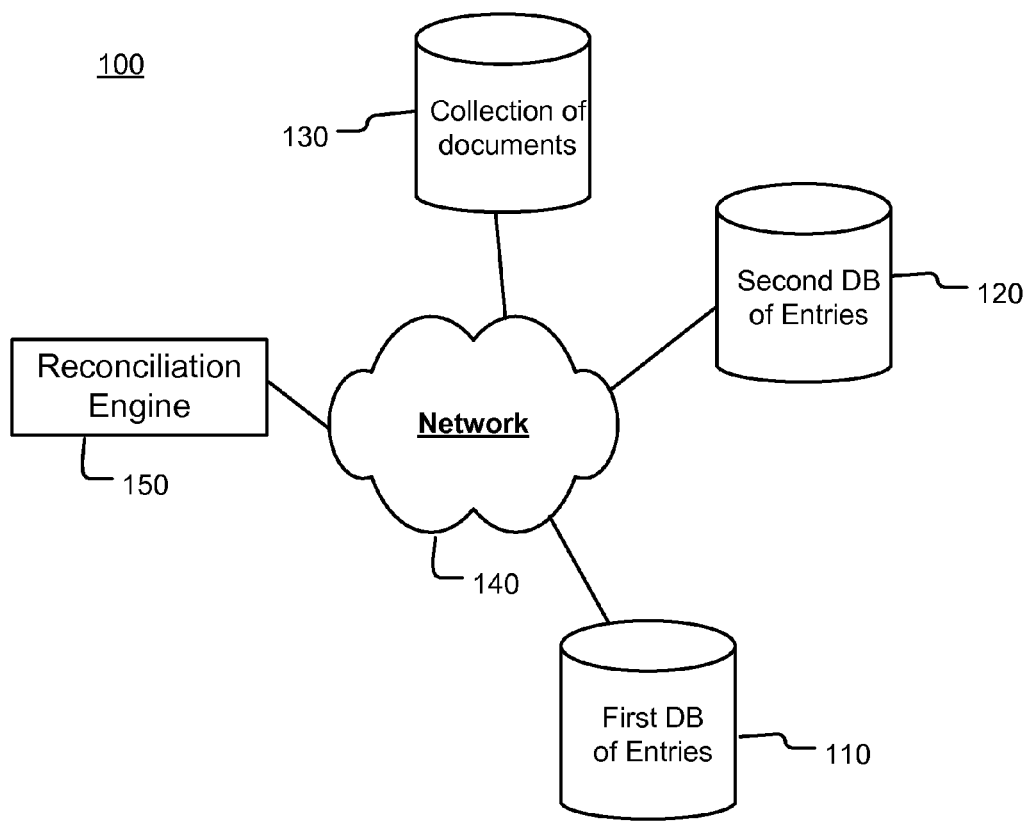
FIG. 1 illustrates a block diagram of an example environment suitable for identifying matching entries between different databases.

FIG. 1 illustrates a block diagram of an example environment 100 suitable for identifying matching entries between different databases. The environment 100 includes a collection 130 of documents, a first database 110 of entries, and a second database 120 of entries. The environment 100 also includes a reconciliation engine 150 for identifying matching entries between the first database 110 and the second database 120 using the techniques described herein. The environment 100 also includes a communication network 140 that allows for communication between various components of the environment 100.

The collection 130 includes a large number of electronic documents. The collection 130 may be stored collectively on multiple computers and/or storage devices. In one embodiment, the collection 130 is obtained from the World Wide Web. In another embodiment, the collection 130 may be smaller, for example obtained from a specific domain. The documents in the collection 130 may for example be obtained manually. As another example, the documents in the collection 130 may be obtained using a search engine.

The term "document" as used herein refers to a collection of text represented in a computer readable format. A document may be for example a web page, or any other type of electronic document. In one embodiment, each document in the collection 130 is assigned a unique identifier referred to as its "Doc ID", and each word in the document is assigned a unique identifier that describes its position in the document and is referred to as its "Pos ID".

The first database 110 may be comprised of one or more computers and/or storage devices which collectively store the corresponding entries. Similarly, the second database 120 may be comprised of one or more computers and/or storage devices which collectively store the corresponding entries.

Each entry in the first database 110 contains data about an object, such as a person, place or thing. Similarly, each entry in the second database 120 contains data about an object. An entry may be divided into fields, where each field includes data about a particular attribute of the corresponding object being represented by the entry. Alternatively, an entry may be unformatted data.

In a database of restaurants, an entry for a particular restaurant may for example include data such as the restaurant name, address, location (e.g. latitude/longitude and/or physical address), phone number and web address of the particular restaurant. As another example, in a database of books, each entry for a particular book may include data such as the title, author, publisher, year published, number of pages and edition of the particular book.

The databases 110, 120 may be maintained by different organizations, or by the same organization. The entries in the first database 110 may for example be structured in a different manner than the entries in the second database 120. In addition, different data conventions may be used for recording data in the first database 110 than that used in the second database 120. Furthermore, the data quality may differ between the first database 110 and the second database 120 due to a variety of factors, including data entry errors and missing data in the entries.

Matching entries occur when an entry in the first database 110 represents an object that an entry in the second database 120 also represents. For example, if the first and second databases 110, 120 are databases of restaurants, a first entry in the first database 110 and a second entry in the second database 120 are matches if the first entry and the second entry both represent the same restaurant. The data between matching entries may for example be identical, or may be different due to misspellings, abbreviations, translations and other factors which can lead to different data representations of the same information.

The reconciliation engine 150 is adapted to identify matching entries between the first database 110 and the second database 120 as described herein. The reconciliation engine 150 can be implemented in hardware, firmware, and/or software. An operator of the reconciliation engine 150 may for example be independent of the organization(s) which maintain the databases 110, 120. The reconciliation engine 150 is described in more detail below with reference to FIGS. 3-7.

The network 140 facilitates communication between the various components in the environment 100. In one embodiment, the network 140 is the Internet. The network can also utilize dedicated or private communications links that are not necessarily part of the Internet. In one embodiment, the network 140 uses standard communications technologies, protocols, and/or interprocess communications techniques.

Figure 2:
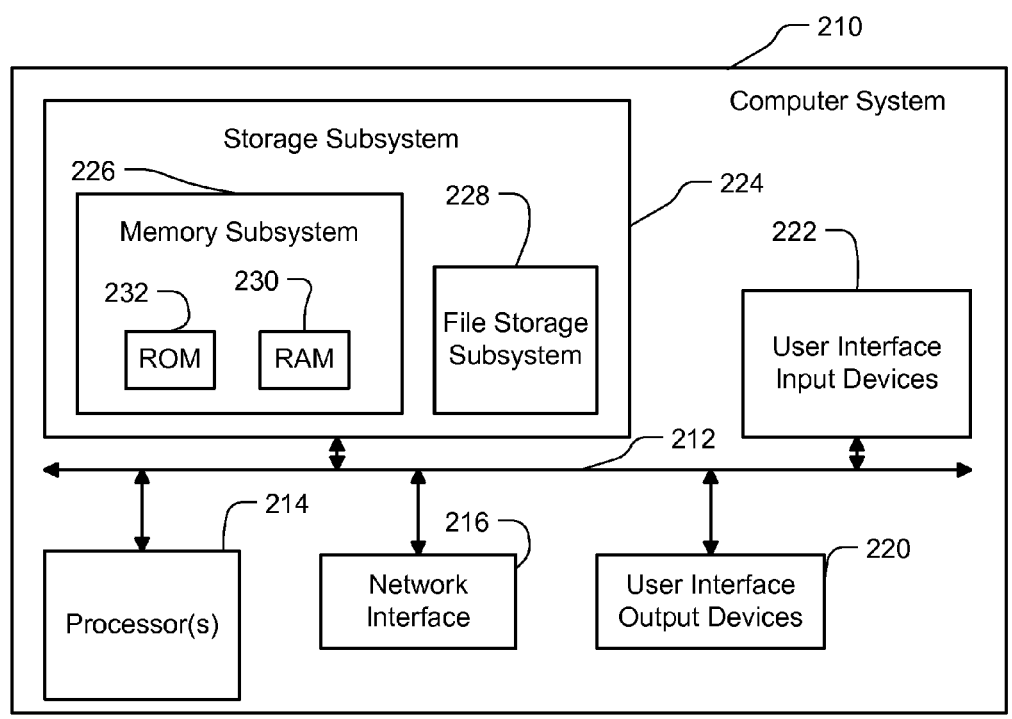
FIG. 2 illustrates a block diagram of an example system suitable for use with embodiments of the technology described herein.

FIG. 2 is a block diagram of an example computer suitable for use with embodiments of the technology. Computer system 210 typically includes at least one processor 214 which communicates with a number of peripheral devices via bus subsystem 212. These peripheral devices may include a storage subsystem 224, comprising for example memory devices and a file storage subsystem, user interface input devices 222, user interface output devices 220, and a network interface subsystem 216. The input and output devices allow user interaction with computer system 210. Network interface subsystem 216 provides an interface to outside networks, including an interface to communication network 140, and is coupled via communication network 218 to corresponding interface devices in other computer systems. Communication network 218 may comprise many interconnected computer systems and communication links. These communication links may be wireline links, optical links, wireless links, or any other mechanisms for communication of information. While in one embodiment, communication network 218 is the Internet, in other embodiments, communication network 218 may be any suitable computer network.

User interface input devices 222 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include possible types of devices and ways to input information into computer system 210 or onto communication network 218.

User interface output devices 220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 210 to the user or to another machine or computer system.

Storage subsystem 224 stores programming and data constructs that provide the functionality of some or all of the modules described herein, including the logic to identify matching entries between the first database 110 and the second database 120 according to the processes described herein. These software modules are generally executed by processor 214 alone or in combination with other processors.

Memory used in the storage subsystem can include a number of memories including a main random access memory (RAM) for storage of instructions and data during program execution and a read only memory (ROM) in which fixed instructions are stored. A file storage subsystem can provide persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem in the storage subsystem 224, or in other machines accessible by the processor.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Computer system 210 can be of varying types including a personal computer, a portable computer, a workstation, a computer terminal, a network computer, a television, a mainframe, a smartphone, a mobile device, or any other data processing system or computing device. Due to the ever-changing nature of computers and networks, the description of computer system 210 depicted in FIG. 2 is intended only as a specific example for purposes of illustrating embodiments. Many other configurations of computer system 210 are possible having more or less components than the computer system depicted in FIG. 2. For example, in some embodiments input and output devices which allow direct user interaction with the computer system 210 are omitted.

Figure 3:
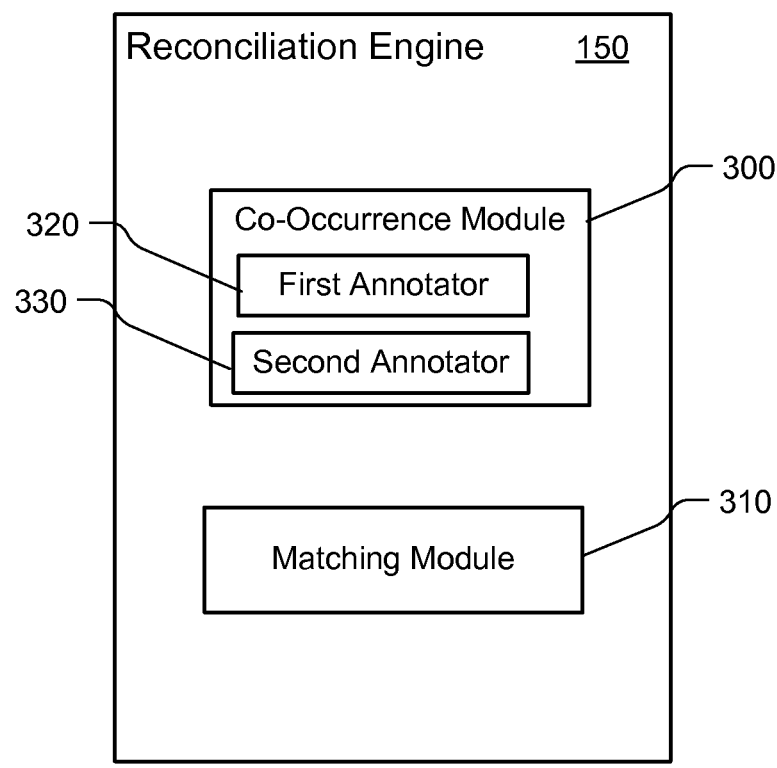
FIG. 3 is a block diagram illustrating modules within the reconciliation engine in accordance with one embodiment.

FIG. 3 is a block diagram illustrating modules within the reconciliation engine 150 in accordance with one embodiment. In FIG. 3, the reconciliation engine 150 includes a co-occurrence module 300 and a matching module 310. Some embodiments may have different and/or additional modules than those shown in FIG. 3. Moreover, the functionalities can be distributed among the modules in a different manner than described here.

The co-occurrence module 300 analyzes the documents in the collection 130 to generate co-occurrence scores between the entries in the first database 110 and the entries in the second database 120. The range of the values for the co-occurrence scores may vary from embodiment to embodiment. As described below, the co-occurrence scores indicate whether data in entries in the first database 110 co-occur within documents in the collection 130 with data in entries in the second database 120.

The co-occurrence module 300 includes a first annotator module 320 and a second annotator module 330. The first annotator module 320 searches and indexes the occurrence of data in the entries in the first database 110 within the documents in the collection 130. For each entry in the first database 110, all the documents in the collection 130 where data in the entry occurs are identified, and the positions at which the data appears in the documents, are recorded in an annotation table or other type of data structure.

In one embodiment, the first annotator module 320 generates an annotation table of occurring entries in the first database 110 on a per-document basis. In such a case, the annotation table for a particular document contains occurrence information identifying the distinct entries in the first database 110 which have data that occurs in the particular document.

In another embodiment, the first annotator module 320 generates an annotation table on a per-entry basis. In such a case, the annotation table for a particular entry in the first database 110 contains occurrence information identifying the distinct documents in the collection 130 in which data in that particular entry occurs.

The technique for determining whether data in a given entry in the first database 110 "occurs" in a particular document can be carried out using pattern matching. In one embodiment, data for a given entry occurs in a particular document if any data in the given entry appears in the particular document. Other techniques may alternatively be used.

The second annotator module 330 searches and indexes the occurrence of data in the entries in the second database 120 within the documents in the collection 130. For each entry in the second database 120, all the documents where data in the entry occurs are identified, and the positions at which the data appears in the documents, are recorded in an annotation table or other type of data structure.

Similar to the first annotator module 320, the second annotator module 330 may generate an annotation table of entries in the second database 120 on a per-document basis. Alternatively, the second annotator module 330 may generate an annotation table on a per-entry basis.

The techniques used by the second annotator module 330 for determining whether data in a given entry in the second database 120 "occurs" in a particular document may, for example, be the same as the techniques used by the first annotator module 330 for determining whether data in an entry in the first database 110 occurs within the documents. Alternatively, these techniques may be different.

The co-occurrence module 300 then compares the first and second annotation tables to produce co-occurrence scores. The co-occurrence scores are subsequently stored in one or more similarity matrices, or other type of data structure, maintained by the co-occurrence module 300. As mentioned above, the co-occurrence scores indicate whether data in entries in the first database 110 co-occur within documents in the collection 130 with data in entries in the second database 120.

The co-occurrence scores produced by the co-occurrence module 300 may include a co-occurrence count between each entry in the first database 110 and each entry in the second database 120. The co-occurrence count between an entry Ai in the first database 110 and an entry Bj in the second database 120 is a measure of the number of documents in the collection 130 in which data in the entry Ai and data in the entry Bj both occur. The co-occurrence counts between the entries in the first database 110 and the entries in the second database 120 are stored in a co-occurrence similarity matrix maintained by the co-occurrence module 300.

The co-occurrence module 300 may also produce additional occurrence statistics for each entry in the first and second databases 110, 120. In one embodiment, the occurrence statistics include an occurrence count and a mentions count. The occurrence count for each particular entry indicates the number of documents in the collection 130 in which data in the particular entry occurs. The mentions count for each particular entry indicates the number of instances of locations across the documents in the collection 130 in which data in the particular entry occurs.

The co-occurrence scores produced by the co-occurrence module 300 may also include a Jaccard similarity between each entry in the first database 110 and each entry in the second database 120. For a given document, the Jaccard similarity J(Ai, Bj) between an entry Ai in the first database 110 and entry Bj in the second database 120 is a measure of the similarity between the instances of locations of data in the entry Ai and the instances of locations of data in the entry Bi within the document. The Jaccard similarity J(Ai,Bj) is the size of the intersection of the set of locations of the data in entry Ai and the set of locations of the data in entry Bj within a particular document, divided by the size of the union of the two sets of locations. For example, an entry A10 in the first database 110 may have data that occurs in a first set of locations {p1, p2, p3} within a particular document, and an entry B8 in the second database 120 may have data that occurs in second set of locations {p1, p2, p4}. In this example, the size of the intersection of the two sets is 2 ({p1,p2}), and the size of the union is 4 ({p1, p2, p3, p4}). Thus, in this example, the Jaccard similarity J(A10,B8) for this particular document is 2/4, or 0.5.

The Jaccard similarities between the entries in the first database 110 and the entries in the second database 120 for each document are aggregated over the collection 130 and the results can be stored in a Jaccard similarity matrix or other data structure maintained by the co-occurrence module 310.

The matching module 310 uses the co-occurrence scores to determine a best match for a given entry in the first database 120 among the entries in the second database 130. The matching module 310 identifies a subset of the entries in the second database 120 as candidate matching entries for the given entry in the first database 120 based on the co-occurrence scores. In one embodiment, the entries in the second database 120 are ranked to identify the candidate matching entries using the following equation:

$$\text{Score}(Ai, Bj) = J(Ai, Bj) \cdot \frac{\text{Occurrence}(Ai)}{\text{Occurrence}(Bj)} \cdot \frac{\text{Mentions}(Ai)}{\text{Mentions}(Bj)}$$

where J(Ai,Bj) is the average Jaccard similarity between entry Ai in the first database 110 and entry Bj in the second database 120 across the collection 130, Occurrence(Ai) is the occurrence count of entry Ai across the collection 130, Occurrence(Bj) is the occurrence count of entry Bj across the collection 130, Mentions (Ai) is the mentions count of entry Ai across the collection 130, and Mentions (Bj) is the mentions count of entry Bj across the collection 130. Alternative embodiments may use other techniques for ranking the entries in the second database 120 and identifying candidate matching entries for entries in the first database 110.

The number of entries in the second database 120 which are selected as possible candidate matching entries for the given entry in the first database 110 can vary from embodiment to embodiment. In one embodiment, the five highest ranking entries in the second database 120 are selected as the candidate matching entries. Alternatively, the number of entries may be different than five.

The matching module 310 then creates a feature vector for each candidate matching entry. In one embodiment, each feature vector includes an occurrence ratio feature, a mentions ratio feature, and a Jaccard similarity feature. The occurrence ratio feature is the ratio of the occurrence count of the given entry in the first database 110 to the occurrence count of the candidate matching entry in the second database 120. The mentions ratio feature is the ratio of the mentions count of the given entry in the first database 110 to the mentions count of the candidate matching entry in the second database 120. The Jaccard similarity feature is the Jaccard similarity between the given entry in the first database 110 and the candidate matching entry in the second database 120 across the collection 130.

The matching module 310 also generates field similarity scores for each candidate matching entry by comparing the data in the given entry in the first database 110 to the data in the candidate matching entry in the second database 120. The field similarity scores may be generated by soft matching the given entry and the candidate matching entry on a field by field basis. The field similarity scores for numerical fields (e.g. geographical coordinates, etc.) may for example be generated by subtracting the data in the given entry from the data in the candidate matching entry, and comparing the result to a threshold value. Other techniques may also be used. The field similarity scores for string fields may for example be generated by comparing the stings using the minimal edit distance. Other techniques such as approximate string matching, the longest common subsequence, and string-to-string correction may alternatively be used.

The field similarity scores and the feature vector for each candidate matching entry are then processed by a classifier in the matching module 310. The classifier may be for example a random forest classifier which has been trained using a training set of matched entries. Alternatively, other classifiers may be used, such as neural network (multi-layer perceptron), support vector machines, k-nearest neighbors, and naïve Baynes.

The classifier outputs a classifier confidence signal for each candidate matching entry that is a measure of the likelihood that the candidate matching entry is a match for the given entry. The classifier confidence signals are then used by the matching module 310 to determine a best match for the given entry among the candidate matching entries.

The criteria for determining the 'best' match can vary from embodiment to embodiment. In one embodiment, the best match is the candidate matching entry having the highest classifier confidence signal output by the classifier. Alternatively, other criteria may be used. For example, in another embodiment, a set of candidate matching entries which have a classifier confidence signal above a threshold may be identified. The best match among the identified set of candidate matching entries may then be determined using other factors, such as the field similarity scores of the identified candidate matching entries. If none of the candidate matching entries have a classifier confidence signal above the threshold, the matching module 310 may flag the given entry for manual matching.

Figure 4:
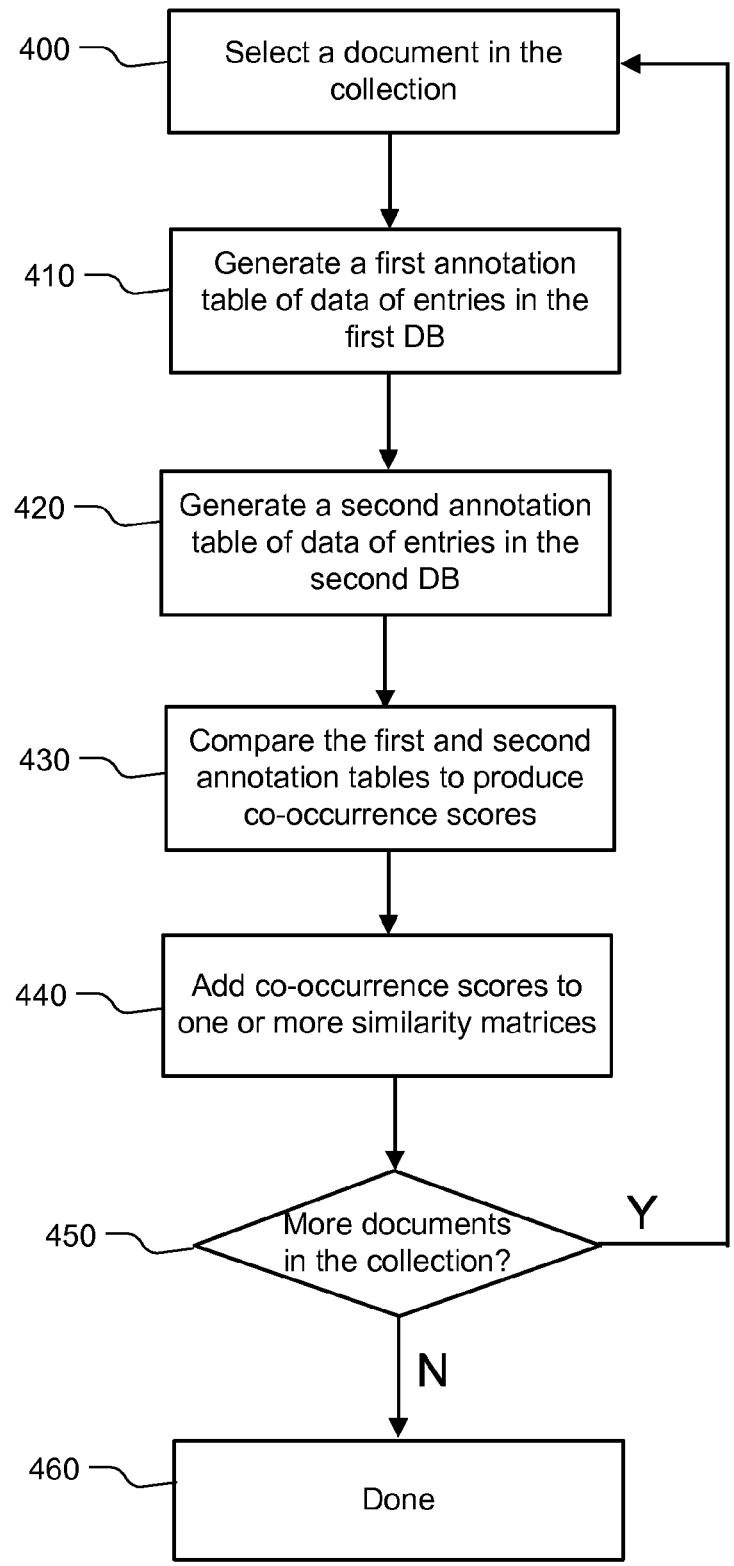
FIG. 4 is a flow chart illustrating an example process for reconciling data.

FIG. 4 is a flow chart illustrating an example process for reconciling data. Other embodiments may perform the steps in different orders and/or perform additional different or additional steps than the ones illustrated in FIG. 4.

In the embodiment illustrated in FIG. 4, the co-occurrence module 300 analyzes each document in the collection 130 in sequence. The co-occurrence module 300 selects a document in the collection 130 (400).

The first annotator module 320 then searches and indexes the occurrence of data in the entries in the first database ("DB") 110 within the selected document to generate a first annotation table, or other type of data structure (410). The first annotation table contains occurrence information identifying the distinct entries in the first database 110 which have data that occurs in the selected document, and the positions at which the data occurs in the selected document.

FIG. 5A illustrates an example first annotation table generated by the first annotator module 320 for the selected document. Each row of the annotation table has the occurrence information for a distinct entry in the first database 110 from the other entries in the first database 110. The leftmost column 500 identifies the entry in the first database 110 by its Entry ID. The row extending rightward from the leftmost column 500 identifies the byte span locations in the selected document in which data in the respective entries occur. If the data in an entry does not occur in the selected document, in one implementation there is no row for that entry. In another implementation, other techniques may be used.

To aid in the understanding of certain processes described herein, an example of matching entries between different databases is presented herein. In this example, a selected document $d_i$ in a collection of documents D={d1, . . . , dn} contains the following:

Milford is a town located in extreme Northern Central Texas in the southwestern corner of Ellis County, Texas United States. The population was 749 in 2008. Milford is located at 32°7'22"N 96°56'48"W (32.122701, −96.946553).

For this example the first database 110 includes an entry A1 for the city Milford, Tex. In this example, the entry A1 is missing data in the state field, and it includes the following data:

| Entry ID | City Name | State | Country | Location |
|---|---|---|---|---|
| A1 | Milford | | U.S.A. | 32.122701, −96.946553 |

In this example, the first annotator module 320 identifies the locations of data in the entry A1 within document $d_i$ at the sentence level. The first annotator module 320 identifies the occurrence of the data 'Milford' in entry A1 appearing in the first and third sentences of the document $d_i$. The first annotator module 320 also identifies the occurrence of the data '32.122701, −96.946553' in entry A1 appearing in the third sentence of $d_i$.

Thus, the first annotator module 320 identifies two locations in the document $d_i$ where the data in the entry A1 occurs—the first sentence and the third sentence. In this example, the identification of the locations in the document $d_i$ are recorded as the byte span of the first word of each sentence where the data in the entry A1 occurs. Thus the recorded locations of data in the entry A1 occurring within the document $d_i$ are:

A1→[0,6], [156,162]

As a result, in this example the leftmost column of the first annotation table will include the Entry ID A1. The row extending rightward from the Entry ID A1 will include byte span [0,6] in a first column and the byte span [156,162] in a second column.

Referring back to FIG. 4, the second annotator module 320 then searches and indexes the occurrence of data in the entries in the second database 120 within the selected document to generate a second annotation table (420). The second annotation table contains occurrence information identifying the distinct entries in the second database 110 which have data that occurs in the selected document, and the positions at which the data appears in the selected document.

FIG. 5B illustrates an example second annotation table generated by the second annotator module 330 for the selected document. Each row of the annotation table has the occurrence information for a distinct entry in the second database 120. The leftmost column 550 identifies the entry in the second database 120 by its Entry ID. The row extending rightward from the leftmost column 550 identifies the byte span locations in the document in which data in the respective entries occur.

Returning to the example from above, suppose the second database 120 includes the following three entries:

| Entry ID | City Name | State | Country |
|---|---|---|---|
| B1 | Milford | Texas | U.S.A. |
| B2 | Milford | Connecticut | U.S.A. |
| B3 | Milford | New York | U.S.A. |

In this example, the data structure of the entries in the second database 120 does not include a Location field.

For this example, the second annotator module 330 identifies the occurrence of data in each of the entries B1, B2, B3 within document $d_i$ at the sentence level. The second annotator module 330 identifies two locations in the document $d_i$ where the data in the entry B1 occurs—the first sentence containing 'Milford' and 'Texas', and the third sentence containing 'Milford'. Since the data in the State field in entry B2 is contrary to the state 'Texas' appearing in the first sentence, in this example the second annotator module 330 identifies only one location in the document $d_i$ where data in the entry B2 occurs—the third sentence containing 'Milford'. Similarly, the data State field in the entry B3 is contrary to the state 'Texas' appearing in the first sentence, so the second annotator module 330 only identifies the third sentence in the document $d_i$ as being where the data in entry B3 occurs. Thus, in this example, the recorded locations of data in the each of the entries B1, B2, B3 within the document $d_i$ are:

B1→[0,6], [156,162]
B2→[156,162]
B3→[156,162]

Referring back to FIG. 4, the co-occurrence module 300 then compares the first and second annotation tables to produce co-occurrence scores for the selected document (430). In the illustrated example, the co-occurrence scores for the selected document include the co-occurrence count and the Jaccard similarity between each entry in the first database 110 and each entry in the second database 120 as discussed above. In the illustrated example, the co-occurrence module 300 also records the occurrence count and the mentions count of each of the entries in the databases 110, 120 within the selected document.

Returning to the example from above, data in entry A1 in the first database 110 and data in each of the entries B1, B2, B3 in the second database were found to occur in the document $d_i$. Thus, the occurrence counts for each of the entries A1, B1, B2, B3 for the document $d_i$ are 1. In addition, the co-occurrence scores between entry A1 and entry B1, between entry A1 and entry B2, and between entry A1 and entry B3 for document $d_i$ are each 1.

Since there are two recorded locations of data in the entry A1 occurring within the document $d_i$, the mentions count of entry A1 for document $d_i$ is 2. Similarly, the mentions count of entry B1 for document $d_i$ is 2. Since there is one recorded location of data in the entry B2 occurring within the document $d_i$, the mentions count of entry B2 for document $d_i$ is 1. Similarly, the mentions count of entry B3 for document $d_i$ is 1.

Since each of the recorded locations of data in the entry A1 overlaps that of entry B1, the Jaccard similarity J(A1,B1) between entry A1 and entry B1 for document $d_i$ is 2/2, or 1. In contrast, since only one of the recorded locations of entry A1 overlaps that of entry B2, the Jaccard similarity J(A1, B2) between entry A1 and entry B2 for document $d_i$ is 1/2, or 0.5. Similarly, since only one of the recorded locations of entry A1 overlaps that of entry B3, the Jaccard similarity J(A1, B3) between entry A1 and entry B3 for document $d_i$ is also 1/2, or 0.5.

Referring back to FIG. 4, the co-occurrence scores for the selected document are then added to appropriate elements in one or more similarity matrices in order to aggregate the co-occurrence scores of each document over the collection 130 (440). In the illustrated example, the co-occurrence counts are added to the appropriate elements in a co-occurrence similarity matrix. The Jaccard similarities are added to the appropriate elements in a Jaccard similarity matrix.

The occurrence statistics for each of the entries in the databases 110, 120 are also aggregated over the collection 130. In some implementations, the aggregation is performed by adding the occurrence count and the mentions counts for each of the entries over all the documents in the collection 130 to appropriate elements in an occurrence and mentions count table.

The actions 400, 410, 420, 430, 440 can then repeated until all the documents in the collection 130 have been searched and indexed (450) by the co-occurrence module 300. The process ends (460).

FIG. 6A illustrates an example co-occurrence similarity matrix. The leftmost column identifies the entry in the first database 110 by its Entry ID (e.g., A1, A2 . . . ). The uppermost row identifies the entry in the second database 120 by its Entry ID (e.g., B1, B2 . . . ). In the example, the matrix element for an entry Ai in the first database 110 and an entry Bj in the second database 120 is the global co-occurrence signal C(Ai, Bj) between entry Ai and entry Bj over all the documents in the collection 130.

FIG. 6B illustrates an example Jaccard similarity matrix. The leftmost column identifies the entry in the first database 110 by its Entry ID (e.g., A1, A2 . . . ). The uppermost row identifies the entry in the second database 120 by its Entry ID (e.g., B1, B2 . . . ). In the example, the matrix element for an entry Ai in the first database 110 and an entry Bj in the second database 120 is the average Jaccard similarity signal J(Ai,Bj) between entry Ai and entry Bj over all the documents the collection 130.

FIG. 6C illustrates an example global occurrence and mentions table. The leftmost column identifies the entry in the first database 110 or the second database 120 by its Entry ID. The column labeled 'Occurrence' contains the occurrence count indicating the number of documents across the collection 130 in which data in each particular entry occurs. The column labeled 'Mentions' contains the mentions count indicating the number of instances of locations in documents across the collection 130 in which data in the particular entry occurs.

Returning to the example from above, a Co-Occurrence Similarity Matrix and a Jaccard Similarity Matrix over all the documents in the collection 130 is given by the following (where a value closer to 1 is better):

| Co-Occurrence Similarity Matrix (a score closer to 1 is better): | | | |
| --- | --- | --- | --- |
| Entry ID | B1 | B2 | B3 |
| A1 | 1.25 | 2.98 | 4.44 |

| Jaccard Similarity Matrix (higher score is better): | | | |
| --- | --- | --- | --- |
| Entry ID | B1 | B2 | B3 |
| A1 | 0.73 | 0.17 | 0.12 |

The Occurrence & Mentions Count Table in this example is given by:

| Occurrence & Mentions Count: | | |
| --- | --- | --- |
| Entry ID | Occurrence | Mentions |
| A1 | 2000 | 4500 |
| B1 | 1600 | 3300 |
| B2 | 670 | 780 |
| B3 | 450 | 530 |

Figure 7:
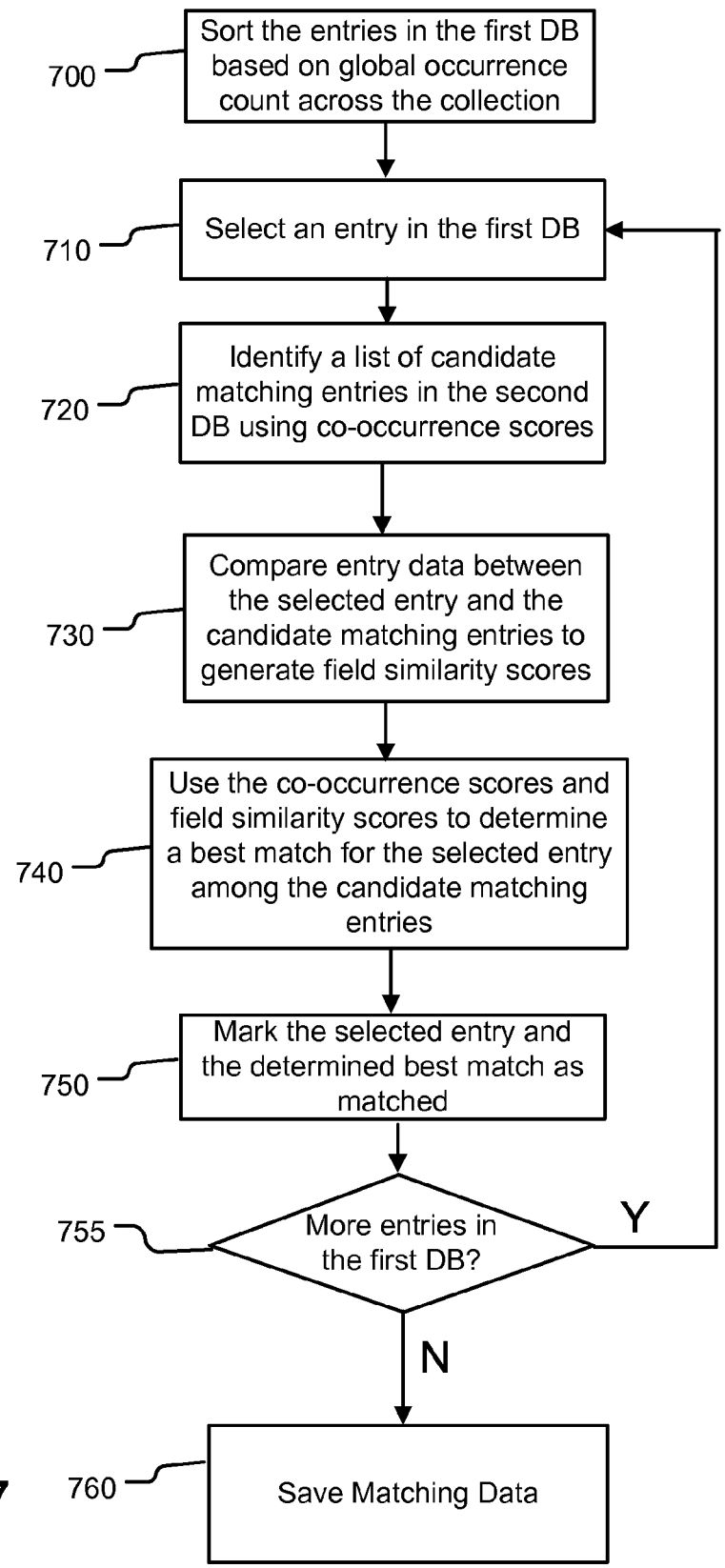
FIG. 7 is a flow chart illustrating an example process for matching data.

FIG. 7 is a flow chart illustrating an example process for matching data.

The matching module 310 sorts the entries in the first database 110 based on the occurrence count of each of the entries across the collection 130 (700). In doing so, the entries in the first database 110 will be matched beginning with the entries having the highest occurrence count.

Next, the matching module 310 selects the entry in the first database 110 with the highest occurrence count (710). The matching module 310 then identifies a list of candidate matching entries in the second database 120 for the selected entry in the first database 110 using the co-occurrence scores generated by the co-occurrence module 300 (720).

The matching module 310 then compares the data in the selected entry to that in each of the candidate matching entries to generate field similarity scores (730). The field similarity scores may be generated by soft matching the selected entry and each of the candidate matching entries on a field by field basis.

The classifier in the matching module 310 then uses the co-occurrence scores and the field similarity scores to determine a best match for the selected entry among the candidate matching entries (740). The selected entry in the first database 110 and the entry in the second database 120 which was determined to be the best match are then marked as 'matched'
to remove them from consideration in subsequent matching of the remaining entries in the first database 110.

The actions 700, 710, 720, 730, 740, 750 can then repeated (755) for the next highest ranked entry in the first database 110, and so on. The matching data indicating the matching between the entries in the first database 110 and the entries in the second database 120 is then stored (760). Additional processes, such as the linking or merging of the matching entries may also be performed.

Returning to the example from above, in this example the field similarity scores between entry A1 and each of the entries B1, B2 and B3 that are input to the classifier are as follows:

| Entry ID | Entry ID | Name Match | State Match | Country Match | Location Match |
| --- | --- | --- | --- | --- | --- |
| A1 | B1 | 1 | Missing Data | 1 | Missing Data |
| A1 | B2 | 1 | Missing Data | 1 | Missing Data |
| A1 | B3 | 1 | Missing Data | 1 | Missing Data |

In this example, the feature vector between entry A1 and each of the entries B1, B2 and B3 that are input to the classifier are given as follows:

| Entry ID | Entry ID | Mentions Ratio | Occurrences Ratio | Jaccard Similarity |
| --- | --- | --- | --- | --- |
| A1 | B1 | 0.770 | 0.810 | 0.632 |
| A1 | B2 | 0.323 | 0.309 | 0.023 |
| A1 | B3 | 0.204 | 0.212 | 0.019 |

In this example, the classifier confidence signal output by the classifier for each of the entries B1, B2 and B3 are as follows:

| Entry ID | Entry ID | Classifier Confidence |
| --- | --- | --- |
| A1 | B1 | 0.97 |
| A1 | B2 | 0.20 |
| A1 | B3 | 0.05 |

Thus, in this example the entry B1 has the highest classifier confidence signal for the entry A1.

Figure 8:
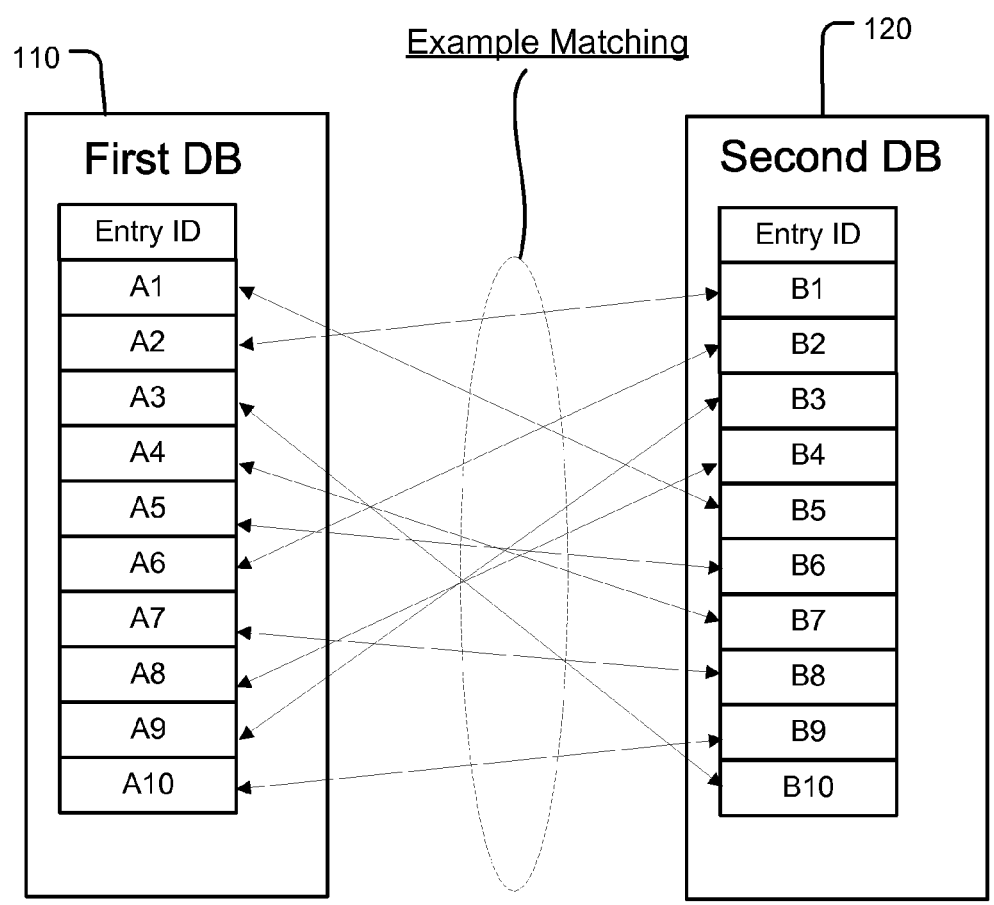
FIG. 8 is a graphical representation of an example of the matching between entries in the first database and entries in the second database.

FIG. 8 is a graphical representation of an example of the matching between entries in the first database 110 and entries in the second database 120. In this illustration, each database 110 and 120 includes ten entries. Typically each database 110 and 120 may for example include thousands of entries, or more. The lines in FIG. 8 between the first database 110 and the second database 120 represent the matching of the entries. For example, entry A6 in the first database 110 is a match for the entry B2 in the second database 120.

In the implementations described above, entries were matched between different databases 110, 120. More generally, the techniques described herein can be utilized to match entries between different sources of data such as databases, files and services.

Figure 9:
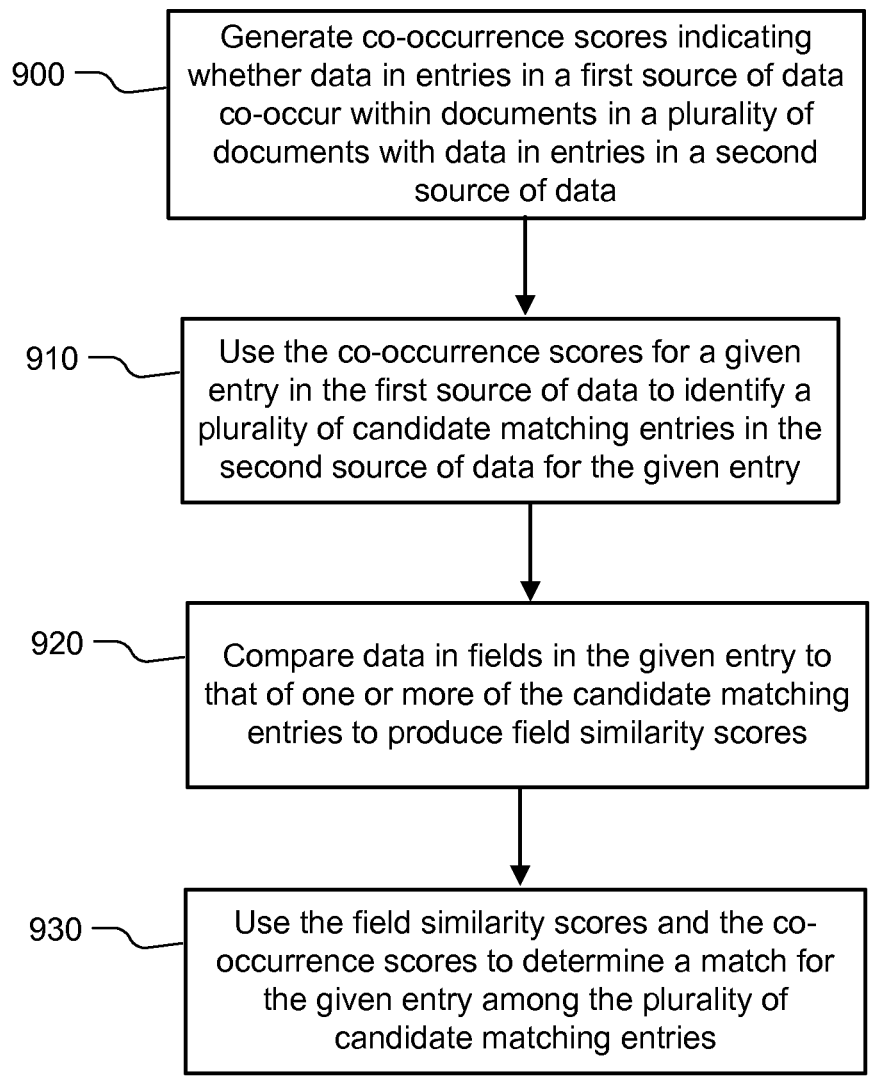
FIG. 9 is a flow chart illustrating an example process for reconciling and matching data.

FIG. 9 is a flow chart illustrating an example process for reconciling and matching data.

Co-occurrence scores are generated indicating whether data in entries in a first source of data co-occur within documents in a plurality of documents with data in entries in a second source of data (900).

The co-occurrence scores for a given entry in the first source of data are used to identify a plurality of candidate matching entries in the second source of data for the given entry (910).

Data in fields in the given entry are compared to that of one or more of the candidate matching entries to produce field similarity scores (920).

The field similarity scores and the co-occurrence scores are used to determine a match for the given entry among the plurality of candidate matching entries (930).

While the present technology is disclosed by reference to the embodiments and examples detailed above, it is understood that these examples are intended in an illustrative rather than in a limiting sense. Computer-assisted processing is implicated in the described embodiments. Accordingly, the present technologies may be embodied in methods for matching entries between different databases, systems including logic and resources to match entries between different databases, systems that take advantage of computer-assisted methods for matching entries between different databases, media impressed with logic to match entries between different databases, data streams impressed with logic to match entries between different databases, or computer-accessible services that carry out computer-assisted methods for matching entries between different databases. It is contemplated that other modifications and combinations will be within the spirit of the invention and the scope of the following claims.

We claim as follows:

1. A method comprising:
generating, by one or more devices, first scores indicating respective likelihood values that data stored in a first entry in a first database and data stored in second entries in a second database occur in a common document,
the second database being separate from the first database,
each of the first entry and the second entries including respective fields, and
a particular field, of the respective fields, including information regarding a particular attribute of an object being represented by the first entry;
identifying, by the one or more devices and based on the first scores, two or more of the second entries in the second database;
generating, by the one or more devices, second scores for the two or more of the second entries,
the two or more of the second entries including a particular second entry,
the second scores including a second score for the particular second entry,
the respective fields including first fields in the first entry and second fields in the particular second entry,
the first fields including the particular field, and
the second score for the particular second entry being generated based on comparing data stored in the first fields in the first entry and data stored in the second fields of the particular second entry;
determining, by the one or more devices, that the second score satisfies a threshold;
identifying, by the one or more devices, the particular second entry, of the two or more of the second entries, based on determining that the second score satisfies the threshold; and
storing, by the one or more devices, information associating the first entry and the particular second entry.

2. The method of claim 1, where generating the first scores includes:
identifying first locations, in a plurality of documents, associated with occurrences of the data stored in the first entry;
identifying second locations, in the plurality of documents, associated with occurrences of the data stored in the second entries; and
generating the first scores based on comparing the first locations and the second locations.

3. The method of claim 1,
where the first database includes first entries, and
where generating the first scores includes:
generating first annotation information describing a first subset of the first entries having data that occurs in the common document;
generating second annotation information describing a second subset of the second entries having data that occurs in the common document; and
generating the first scores based on comparing the first annotation information and the second annotation information.

4. The method of claim 3, where:
the common document is included in a plurality of documents,
the first annotation information includes data identifying locations, in the plurality of documents, associated with the data stored in the first entries,
the second annotation information includes data identifying locations, in the plurality of documents, associated with the data stored in the second entries, and
generating the first scores further includes:
generating co-occurrence information using the first annotation information and the second annotation information; and
using the co-occurrence information to generate the first scores.

5. The method of claim 1, where generating the first scores further includes:
generating first annotation information describing documents in a plurality of documents in which the data stored in the first entry occurs;
generating second annotation information describing documents in the plurality of documents in which data stored in the particular second entry Occurs;
comparing the first annotation information and the second annotation information to produce co-occurrence information; and
using the co-occurrence information to generate a particular first score, of the first scores, associated with the particular second entry.

6. The method of claim 1, where generating the first scores further includes:
identifying a particular entry that is included in both the first database and the second database;
generating an occurrence count for the particular entry,
the occurrence count indicating a quantity of documents, in a plurality of documents, in which data stored in the particular entry occurs;
generating a mentions count for the particular entry in the first database and the second database,
the mentions count indicating a number of locations in the plurality of documents associated with occurrences of the data stored in the particular entry; and
using the occurrence count and the mentions count for the particular entry to generate the first scores.

7. The method of claim 1, including:
   identifying entries that are common to both the first database and the second database;
   generating respective occurrence counts for the identified entries,
      the respective occurrence counts indicating corresponding quantities of documents, among a plurality of documents, associated with data stored in the identified entries; and
   selecting, as the first entry, one of the identified entries having a largest one of the respective occurrence counts.

8. The method of claim 7, further comprising:
   selecting another first entry in the first database based on the respective occurrence counts,
      the other first entry having a next largest occurrence count among the identified entries after the first entry;
   determining other first scores associated with the other first entry;
   using the other first scores for the other first entry to identify another two or more of the second entries associated with the other first entry;
   determining other second scores for the other two or more of the second entries; and
   using the other second scores and the other first scores to determine a best match among the other two or more second entries with respect to the other first entry.

9. A non-transitory computer readable storage medium storing instructions, the instructions comprising:
   one or more instructions that, when executed by one or more computing devices, cause the one or more computing devices to:
      generate first scores indicating respective likelihood values that data stored in a first entry in a first database and data stored in second entries in a second database occur in a common document,
         the second database being separate from the first database,
         each of the first entry and the second entries including respective fields, and
         a particular field, of the respective fields, including information regarding a particular attribute of an object being represented by the first entry;
      identify, based on the first scores, two or more of the second entries in the second database;
      generate second scores for the two or more of the second entries,
         the two or more of the second entries including a particular second entry,
         the second scores including a second score for the particular second entry,
         the respective fields including first fields in the first entry and second fields in the particular second entry,
         the first fields including the particular field, and
         the second score for the particular second entry being generated based on comparing data stored in the first fields in the first entry and data stored in the second fields of the particular second entry;
      determine that the second score satisfies a threshold;
      identify the particular second entry, of the two or more of the second entries, based on determining that the second score satisfies the threshold; and
      store information associating the first entry and the particular second entry.

10. The non-transitory computer readable storage medium of claim 9, where the one or more instructions to generate the first scores further include:
   one or more instructions to:
      identify first locations, in a plurality of documents, associated with occurrences of the data stored in the first entry;
      identify second locations, in the plurality of documents, associated with occurrences of the data stored in the second entries; and
      generate the first scores based on comparing the first locations and the second locations.

11. The non-transitory computer readable storage medium of claim 9,
   where the first database includes first entries, and
   where the one or more instructions to generate the first scores include:
      one or more instructions to:
         generate first annotation information describing a first subset, of the first entries in the first database having data that occurs in the common document;
         generate second annotation information describing a second subset, of the second entries in the second database, having data that occurs in the common document; and
         generate the first scores based on comparing the first annotation information and the second annotation information.

12. The non-transitory computer readable storage medium of claim 11, where:
   the common document is included in a plurality of documents,
   the first annotation information includes data identifying locations, in the plurality of documents, associated with the data stored in the first entries,
   the second annotation information includes data identifying locations, in the plurality of documents, associated with the data stored in the second entries, and
   the one or more instructions to generate the first scores further include:
      one or more instructions to:
         generate co-occurrence information using the first annotation information and the second annotation information; and
         use the co-occurrence information to generate the first scores.

13. The non-transitory computer readable storage medium of claim 9, where the one or more instructions to generate the first scores further include:
   one or more instructions to:
      generate first annotation information describing documents in a plurality of documents in which the data stored in the first entry occurs;
      generate second annotation information describing documents in the plurality of documents in which data stored in the particular second entry occurs;
      compare the first annotation information and the second annotation information to produce co-occurrence information; and
      use the co-occurrence information to generate a particular first score, of the first scores, associated with the particular second entry.

14. The non-transitory computer readable storage medium of claim 9, where the one or more instructions to generate the first scores further include:
   one or more instructions to:
      identify a particular entry that is included in both the first database and the second database;

generate an occurrence count for the particular entry,
the occurrence count indicating a quantity of documents, in a plurality of documents, in which data stored in the particular entry occurs;
generate a mentions count for the particular entry in the first database and the second database,
the mentions count indicating a number of locations in the plurality of documents associated with occurrences of the data stored in the particular entry; and
use the occurrence count and the mentions count for the particular entry to generate the first scores.

15. The non-transitory computer readable storage medium of claim 9, where the instructions further comprise:
one or more instructions to:
identify entries that are common to both the first database and the second database;
generate respective occurrence counts for the identified entries,
the respective occurrence counts indicating corresponding quantities of documents, among a plurality of documents, associated with data stored in the identified entries; and
select, as the first entry, one of the identified entries having a largest one of the respective occurrence counts.

16. The non-transitory computer readable storage medium of claim 15, where the instructions further comprise:
one or more instructions to:
select another first entry in the first database based on the respective occurrence counts,
the other first entry having a next largest occurrence count among the identified entries after the first entry;
determine other first scores associated with the other first entry;
use the other first scores for the other first entry to identify another two or more of the second entries associated with the other first entry;
determine other second scores for the other two or more of the second entries; and
use the other second scores and the other first scores to determine a best match among the other two or more second entries with respect to the other first entry.

17. A system comprising:
a memory; and
one or more processors to:
generate first scores indicating respective likelihood values that data stored in a first entry in a first database and data stored in second entries in a second database occur in a common document,
the second database being separate from the first database,
each of the first entry and the second entries including respective fields, and
a particular field, of the respective fields, including information regarding a particular attribute of an object being represented by the first entry,
identify, based on the first scores, two or more of the second entries in the second database,
generate second scores for the two or more of the second entries,
the two or more of the second entries including a particular second entry,
the second scores including a second score for the particular second entry,
the respective fields including first fields in the first entry and second fields in the particular second entry,
the first fields including the particular field, and
the one or more processors generating the second score for the particular second entry based on comparing data stored in the first fields in the first entry and data stored in the second fields of the particular second entry,
determine that the second score satisfies a threshold;
identify the particular second entry, of the two or more of the second entries, based on determining that the second score satisfies the threshold, and
store, in the memory, information associating the first entry and the particular second entry.

18. The system of claim 17, where the one or more processors, when generating the first scores, are further to:
identify first locations, in a plurality of documents, associated with occurrences of the data stored in the first entry,
identify second locations, in the plurality of documents, associated with occurrences of the data stored in the second entries, and
generate the first scores based on comparing the first locations and the second locations.

19. The system of claim 17,
where the first database includes first entries, and
where the one or more processors, when generating the first scores, are further to:
generate first annotation information describing a first subset of the first entries having data that occurs in the common document,
generate second annotation information describing a second subset of the second entries having data that occurs in the common document, and
generate the first scores based on comparing the first annotation information and the second annotation information.

20. The system of claim 19, where:
the common document is included in a plurality of documents,
the first annotation information includes data identifying locations, in the plurality of documents, associated with the data stored in the first entries,
the second annotation information includes data identifying locations, in the plurality of documents, associated with the data stored in the second entries, and
the one or more processors, when generating the first scores, are further to:
generate co-occurrence information using the first annotation information and the second annotation information, and
use the co-occurrence information to generate the first scores.

21. The system of claim 17, where the one or more processors, when generating the first scores, are further to:
generate first annotation information describing documents in a plurality of documents in which the data stored in the first entry occurs,
generate second annotation information describing documents in the plurality of documents in which data stored in the particular second entry occurs,
compare the first annotation information and the second annotation information to produce co-occurrence information, and
use the co-occurrence information to generate a particular first score, of the first scores, associated with the particular second entry.

22. The system of claim 17, where the one or more processors, when generating the first scores, are further to:
  identify a particular entry that is included in both the first database and the second database,
  generate an occurrence count for the particular entry,
    the occurrence count indicating a quantity of documents in a plurality of documents in which data stored in the particular entry occurs,
  a mentions count for the particular entry in the first database and the second database,
    the mentions count indicating a number of locations in the plurality of documents associated with occurrences of the data stored in the particular entry, and
  use the occurrence count and the mentions count, for the particular entry, to generate the first scores.

23. The system of claim 17, where the one or more processors are further to:
  identify entries that are common to both the first database and the second database,
  generate respective occurrence counts for the identified entries,
    the respective occurrence counts indicating corresponding quantities of documents, among a plurality of documents, associated with data stored in the identified entries, and
  select, as the first entry, one of the identified entries having a largest one of the respective occurrence counts.

24. The system of claim 23, where the one or more processors are further to:
  select another first entry in the first database based on the respective occurrence counts,
    the other first entry having a next largest occurrence count among the identified entries after the first entry,
  determining other first scores associated with the other first entry,
  use the other first scores for the other first entry to identify another two or more of the second entries associated with the other first entry,
  determine other second scores for the other two or more of the second entries, and
  use the other second scores and the other first scores to determine a best match among the other two or more second entries with respect to the other first entry.

\* \* \* \* \*

UNITED STATES PATENT AND TRADEMARK OFFICE
CERTIFICATE OF CORRECTION

PATENT NO.         : 8,849,835 B1                           Page 1 of 1
APPLICATION NO.    : 13/287641
DATED              : September 30, 2014
INVENTOR(S)        : Eyal Carmi et al.

It is certified that error appears in the above-identified patent and that said Letters Patent is hereby corrected as shown below:

In the Claims

Please correct Claim 5 as follows:

Column 16, line 46, change "Occurs" to -- occurs --.

Signed and Sealed this
Twenty-eighth Day of July, 2015

Michelle K. Lee
*Director of the United States Patent and Trademark Office*